(12) United States Patent
Akkarakaran et al.

(10) Patent No.: US 10,805,959 B2
(45) Date of Patent: Oct. 13, 2020

(54) BEAM INDICATION DURING RANDOM ACCESS CHANNEL (RACH) PROCEDURE

(71) Applicant: QUALCOMM Incorporated, San Diego, CA (US)

(72) Inventors: Sony Akkarakaran, Poway, CA (US); Makesh Pravin John Wilson, San Diego, CA (US); Tao Luo, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/037,693

(22) Filed: Jul. 17, 2018

(65) Prior Publication Data

US 2019/0029049 A1 Jan. 24, 2019

Related U.S. Application Data

(60) Provisional application No. 62/534,153, filed on Jul. 18, 2017.

(51) Int. Cl.
*H04W 74/08* (2009.01)
*H04W 72/04* (2009.01)
(Continued)

(52) U.S. Cl.
CPC ..... *H04W 74/0833* (2013.01); *H04W 72/046* (2013.01); *H04W 72/085* (2013.01); *H04W 16/28* (2013.01); *H04W 88/02* (2013.01)

(58) Field of Classification Search
CPC ............. H04W 74/0833; H04W 16/18; H04W 72/085; H04W 72/046; H04W 88/02; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS 9,468,022 B2 10/2016 Li et al.
9,814,068 B2 11/2017 Frenne et al.
(Continued)

FOREIGN PATENT DOCUMENTS

WO WO-2014007546 A1 1/2014

OTHER PUBLICATIONS

Fujitsu: "Discussion on RAR in NR Considering Reciprocity Issues", 3GPP DRAFT; R1-1611462 Discussion on RAR in NR Considering Reciprocity Issues Final, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051175441, Retrieved from the Internet: URL:http://www.3gpp.org/ftp/Meetings_3GPP_SYNC/RAN1/Docs/ [retrieved on Nov. 13, 2016], 6 pages.
(Continued)

*Primary Examiner* — Sharad Rampuria
(74) *Attorney, Agent, or Firm* — Patterson + Sheridan, LLP

(57) ABSTRACT

Certain aspects of the present disclosure provide techniques for random-access channel (RACH) communication. For example, certain aspects provide a method for providing an indication, via a first uplink transmission, of a preferred beam for a subsequent (uplink or downlink) transmission.

28 Claims, 11 Drawing Sheets

(51) Int. Cl.
  *H04W 72/08*   (2009.01)
  *H04W 16/28*   (2009.01)
  *H04W 88/02*   (2009.01)

(56) References Cited

U.S. PATENT DOCUMENTS

| 9,949,298 | B1* | 4/2018 | Akoum | H04W 74/006 |
| 2014/0010178 | A1* | 1/2014 | Yu | H04W 74/0833 |
| | | | | 370/329 |
| 2014/0177607 | A1* | 6/2014 | Li | H04W 52/42 |
| | | | | 370/336 |
| 2016/0192401 | A1 | 6/2016 | Park et al. | |
| 2017/0367120 | A1 | 12/2017 | Murray et al. | |

OTHER PUBLICATIONS

International Search Report and Written Opinion—PCT/US2018/042714—ISA/EPO—dated Sep. 28, 2018.
SAMSUNG: "Discussion on RA Procedure",3GPP DRAFT; R1-1609117, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016, XP051149166, Retrieved from the Internet: URL:http://www.3gpp.org/ftp/Meetings_3GPP_SYNC/RAN1/Docs/ [retrieved on Oct. 9, 2016], 4 pages.

\* cited by examiner

BEAM INDICATION DURING RANDOM ACCESS CHANNEL (RACH) PROCEDURE

CLAIM OF PRIORITY UNDER 35 U.S.C. § 119

This application claims the benefit of U.S. Provisional Patent Application Ser. No. 62/534,153, filed Jul. 18, 2017, which is herein incorporated by reference in its entirety.

INTRODUCTION

Aspects of the present disclosure relate to wireless communications, and more particularly, random-access channel (RACH) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user-equipment (UE). The method generally includes determining at least one preferred beam for at least one subsequent transmission, based on one or more downlink signals and an anticipated time of the at least one subsequent transmission and providing an indication of the preferred beam via a first uplink transmission.

Certain aspects of the present disclosure provide a method for wireless communication that may be performed by a network entity. The method generally includes signaling configuration information indicating a partitioning of different sets of resources to use for indicating different preferred beams, receiving a first uplink transmission from a user equipment (UE) sent using one of the sets of resources, and determining, based on the partitioning and the set of resources used to send the first uplink transmission, at least one preferred beam for at least one subsequent transmission.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
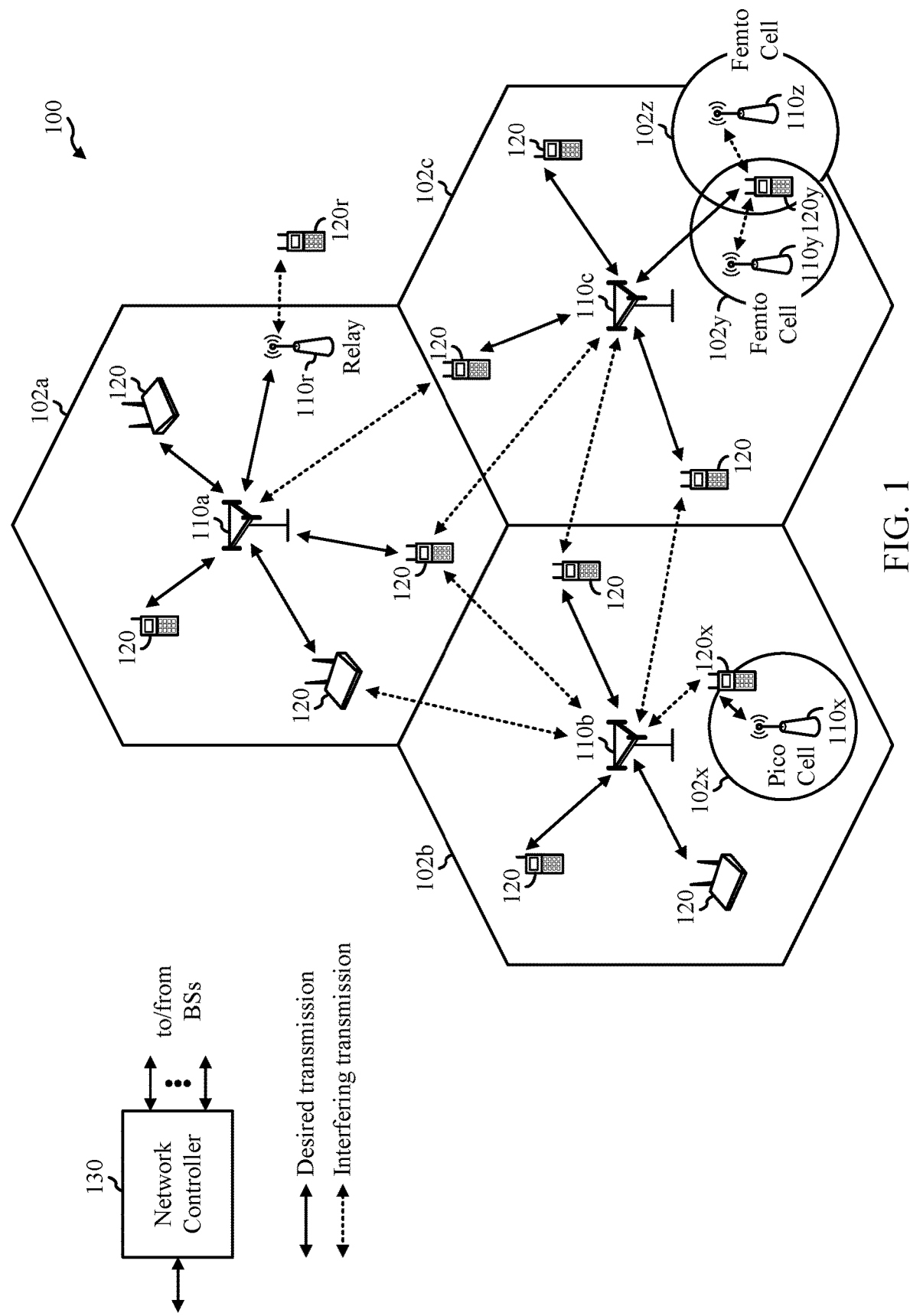
FIG. 1 is a block diagram conceptually illustrating an example telecommunications system, in accordance with certain aspects of the present disclosure.

Aspects of the present disclosure provide apparatus, methods, processing systems, and computer readable mediums for random-access channel (RACH) communication.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. As described herein, a BS may monitor active beams using measurements of reference signals (e.g., MRS, CSI-RS, synch) transmitted via reference beams.

UEs 120 may be configured to perform the operations 1000 and methods described herein for detecting a mobility events based, at least in part, on mobility parameters associated with a beam set. BS 110 may comprise a transmission reception point (TRP), Node B (NB), 5G NB, access point (AP), new radio (NR) BS, etc.). BS 110 may be configured to perform the operations 900 and methods described herein for configuring beam sets and mobility parameters associated with each of the beam sets. The BS may receive an indication of a detected mobility event based on the mobility parameters and may make a decision regarding mobility management of the UE based on the event trigger.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
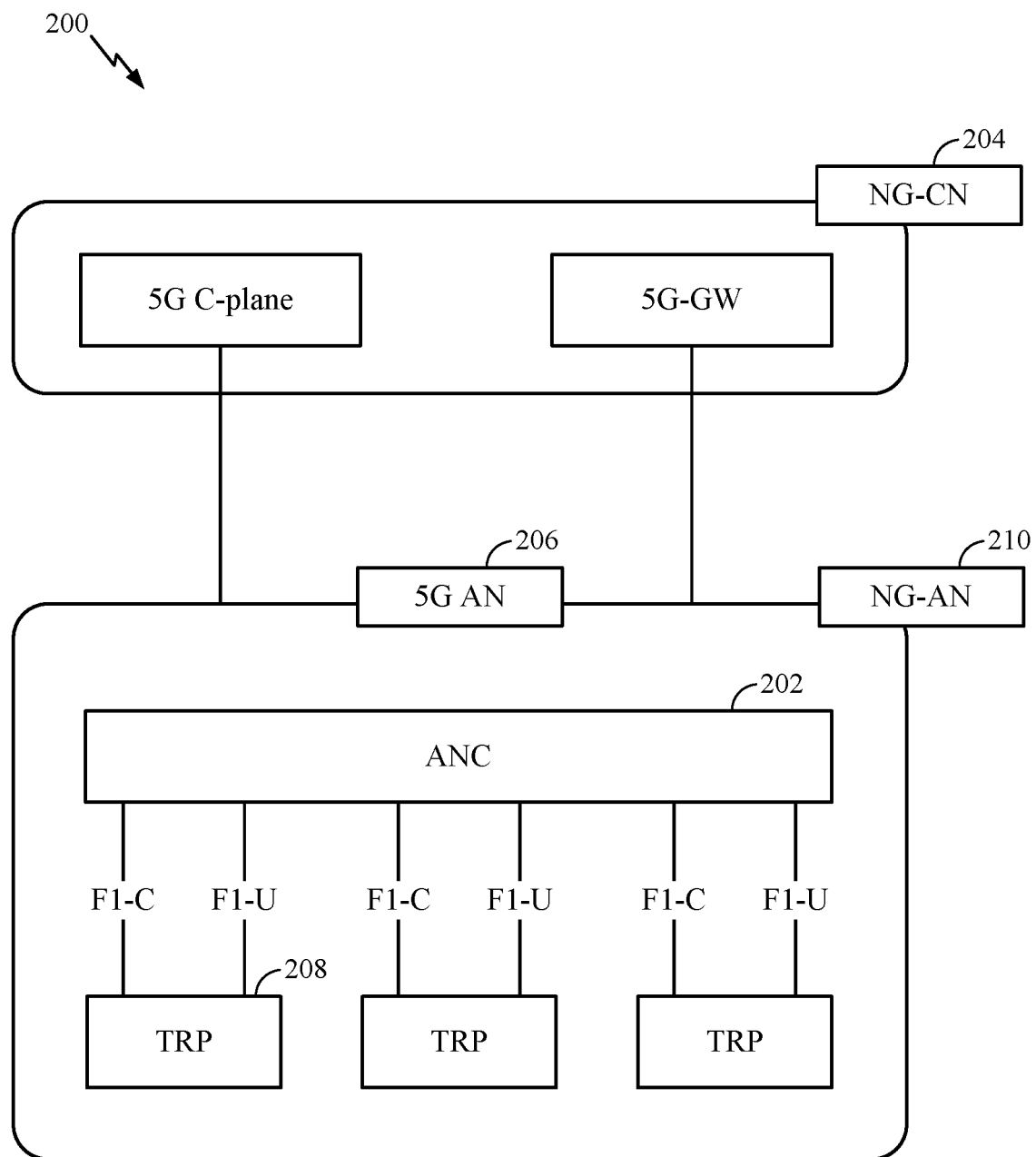
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
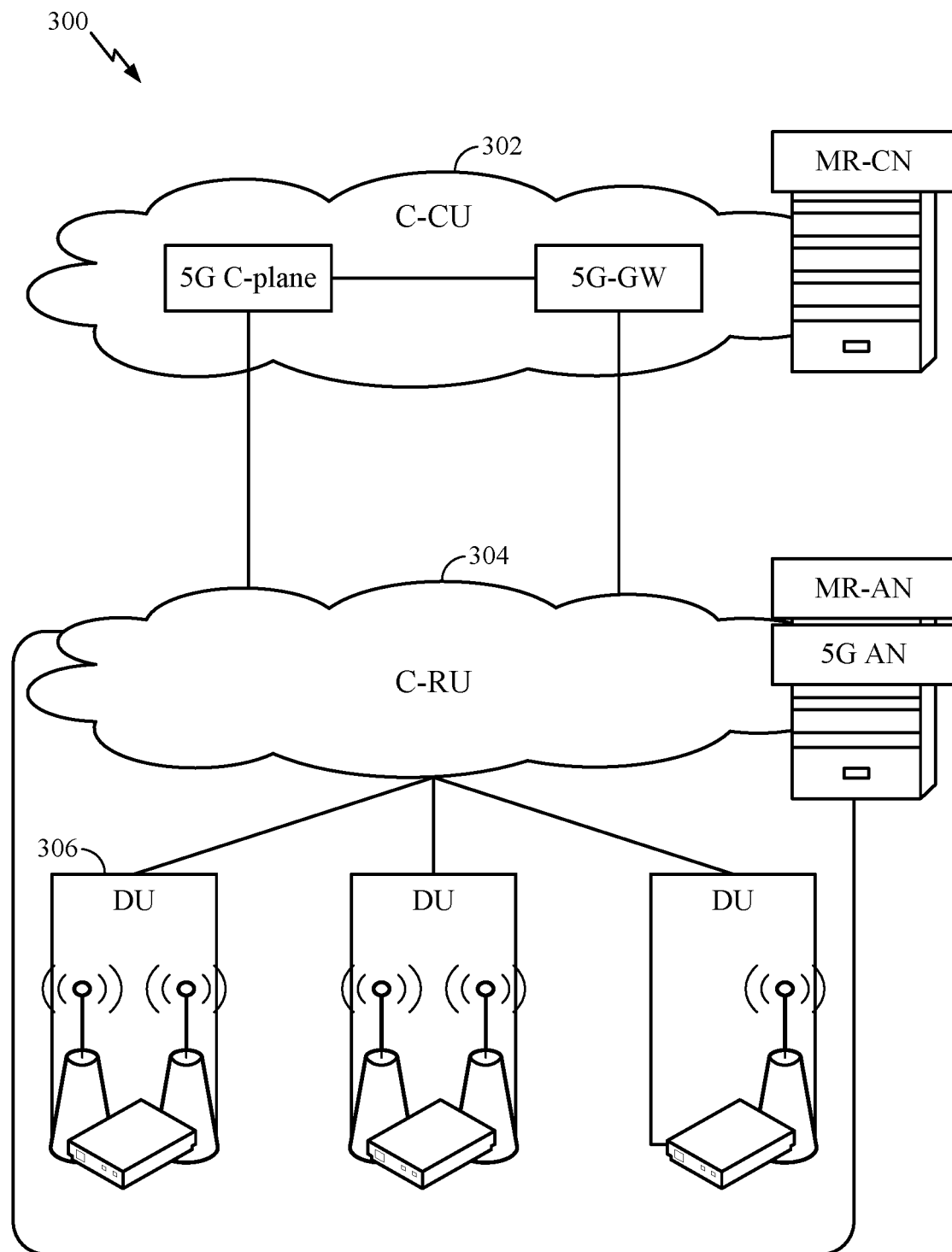
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like. The DU may be located at edges of the network with radio frequency (RF) functionality.

Figure 4:
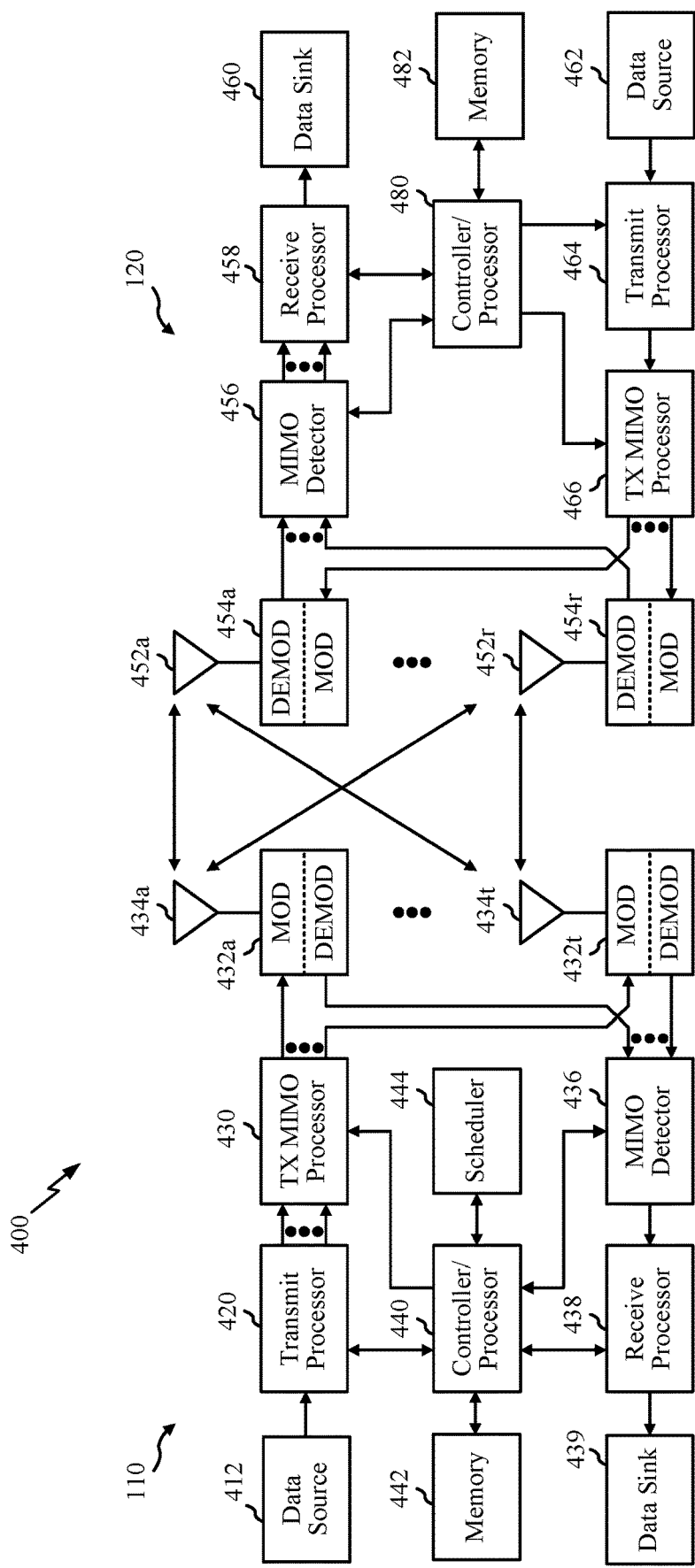
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in various figures, and/or other processes for the techniques described herein. The processor 480 and/or other processors and modules at the UE 120 may also perform or direct, e.g., the execution of the corresponding/complementary processes for the techniques described herein and as illustrated in various figures. The memories 442 and 482 may store data and program codes for the BS 110 and the UE 120, respectively. A scheduler 444 may schedule UEs for data transmission on the downlink and/or uplink.

Figure 5:
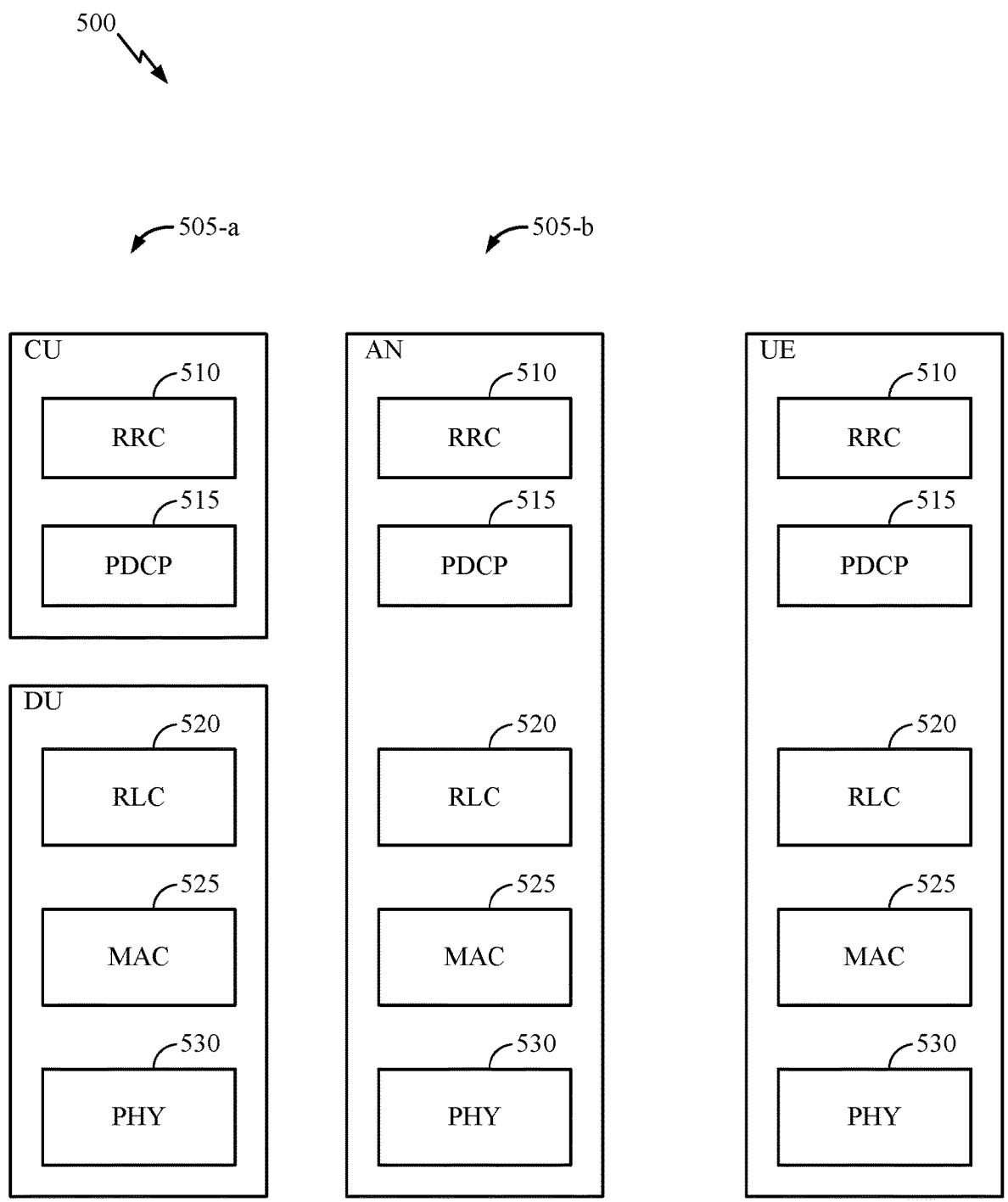
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
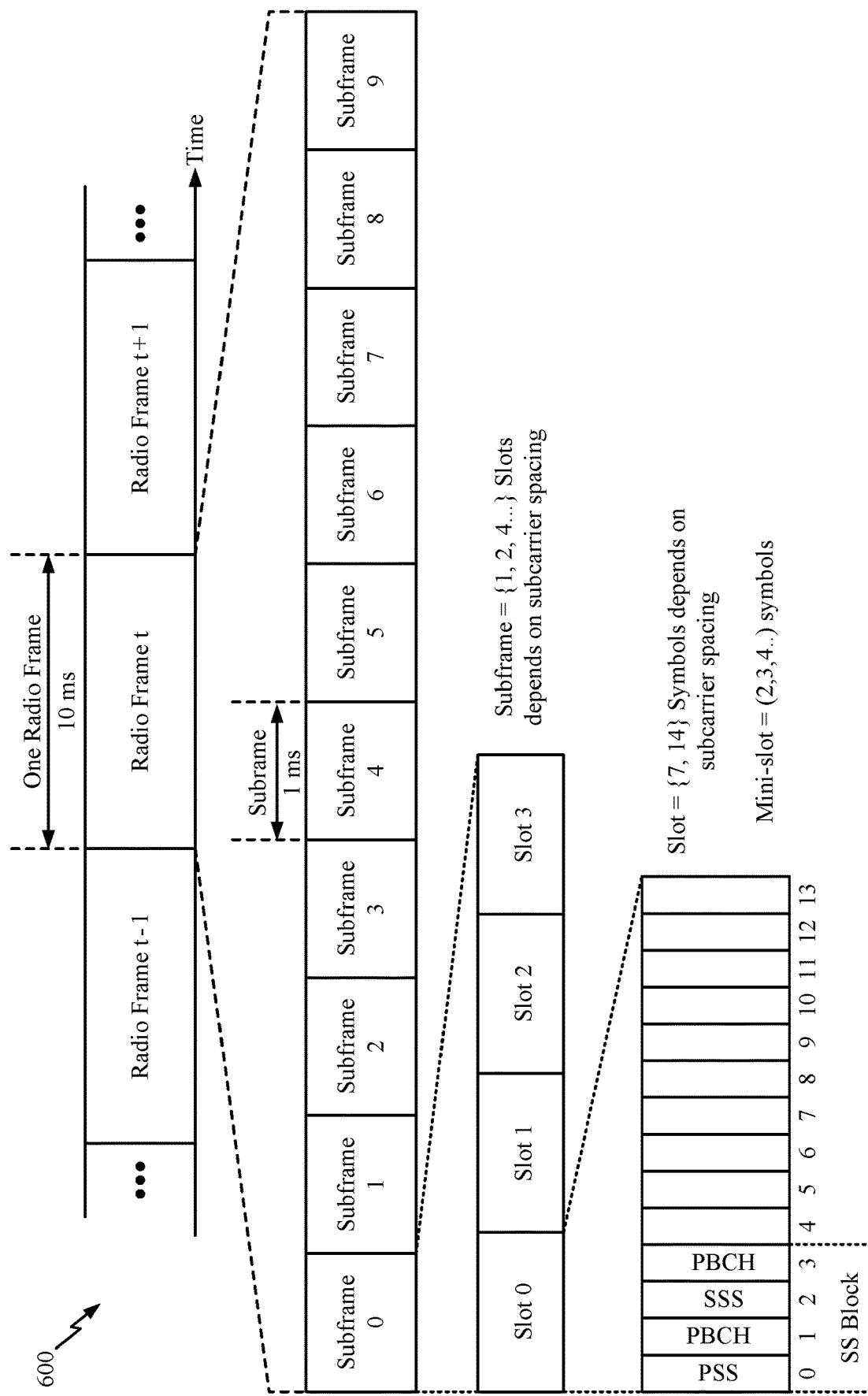
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example mmWave Systems

As used herein, the term mmWave generally refers to spectrum bands in very high frequencies such as 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using the beams for RACH communication.

Figure 7:
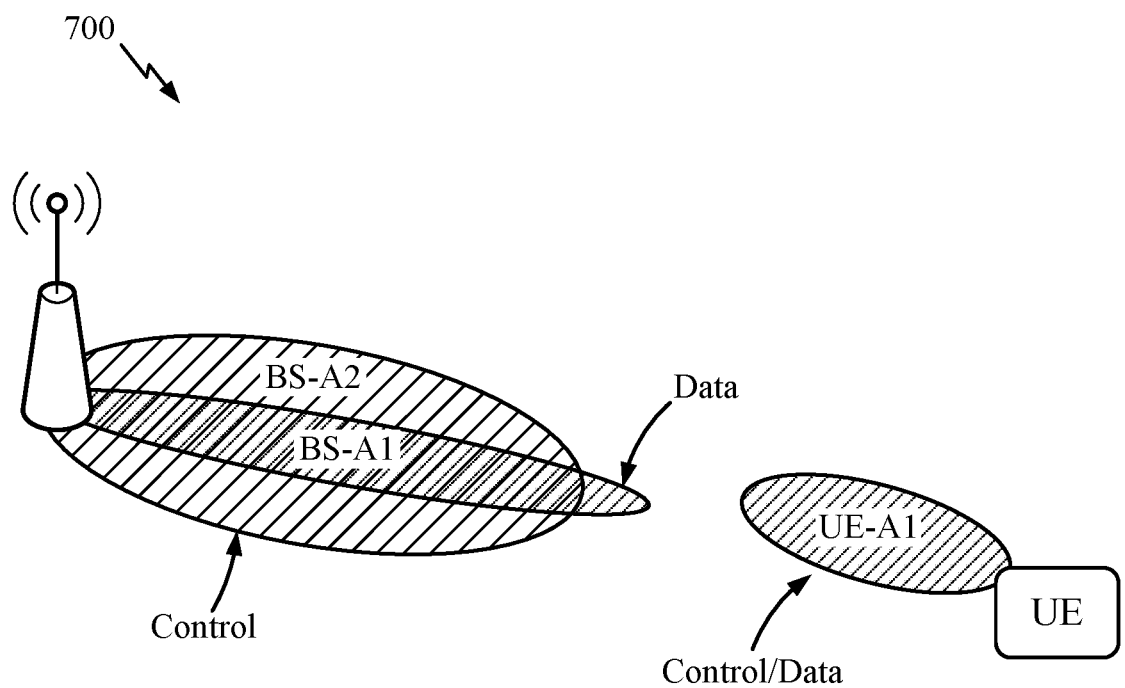
FIG. 7 illustrates an example of the use of different types of beams, in accordance with certain aspects of the present disclosure.

FIG. 7 illustrates an example of active beams 700, in accordance with aspects of the present disclosure. A BS and a UE may communicate using a set of active beams. Active beams may refer to BS and UE beam pairs that are used to transmit data and control channels. A data beam may be used to transmit data and a control beam may be used to transmit control information. As illustrated in FIG. 7, data beam BS-A1 may be used to transmit DL data and control beam BS-A2 may be used to transmit DL control information.

A BS may monitor beams using beam measurements and feedback from a UE. For example, a BS may monitor active beams using DL reference signals. A BS may transmit a DL RS, such as a measurement reference signal (MRS), channel state information reference signal (CSI-RS), or a synchronization (synch) signal. A UE may report, to the BS, a reference signal receive power (RSRP) associated with a received reference signal. In this manner, the BS may monitor active beams.

Example Random Access Channel (RACH) Procedure

A random-access channel (RACH) is channel that may be shared by multiple UEs and may be used by the UEs to access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network. Certain aspects of the present disclosure provide multiple RACH procedures and techniques for selecting a RACH procedure for communication.

Figure 8:
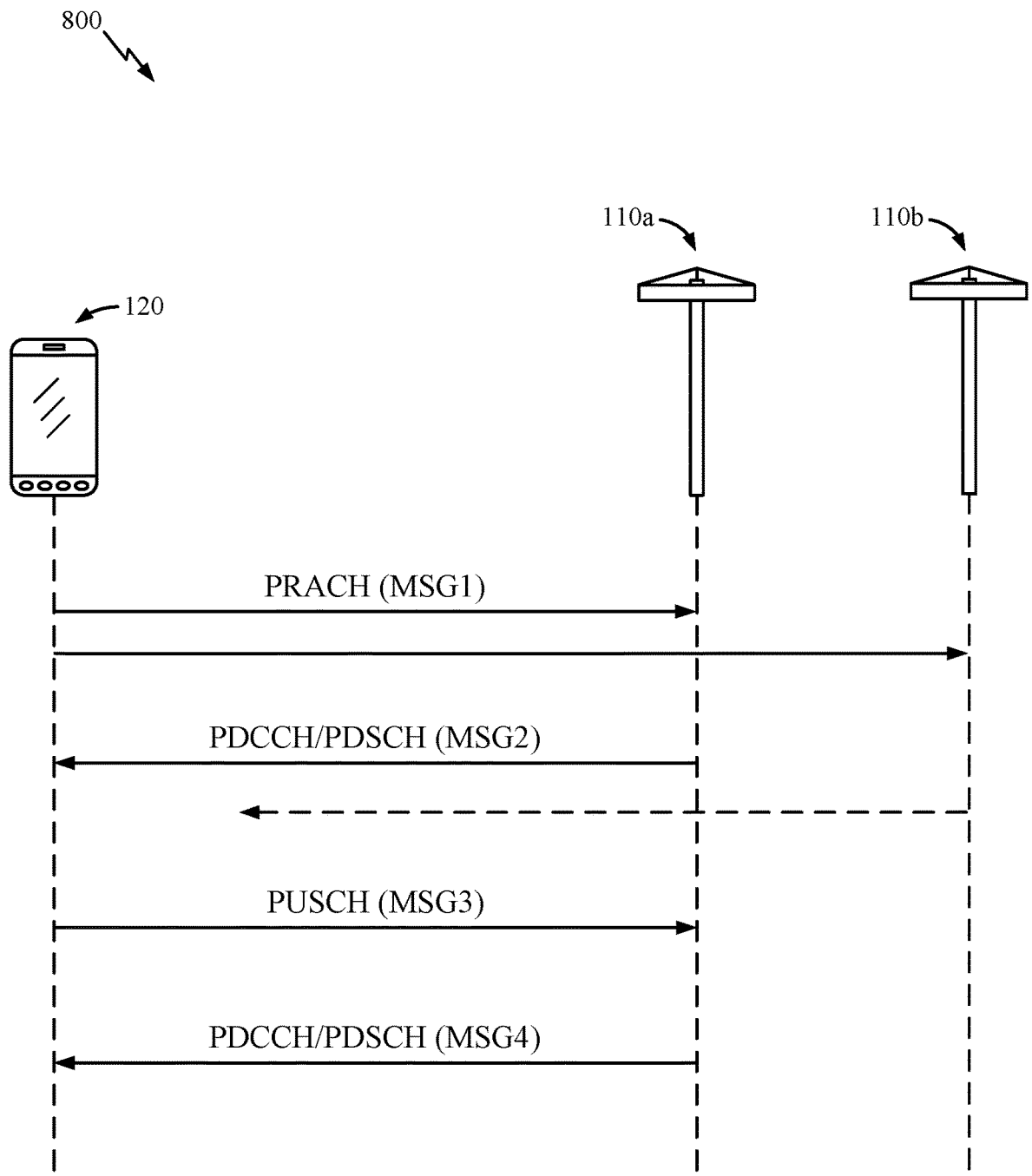
FIG. 8 illustrates a call-flow diagram for an example four-step random-access channel (RACH) procedure, in accordance with certain aspects of the present disclosure.

FIG. 8 is a timing (or "call-flow") diagram 800 illustrating an example four-step RACH procedure, in accordance with certain aspects of the present disclosure. A first message (MSG1) may be sent from the UE 120 to eNB 110*a* and eNB 110*b* on the physical random access channel (PRACH). In this case, MSG1 may only include a RACH preamble. At least one of eNB 110*a* or eNB 110*b* may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to eNB 110a on the PUSCH. MSG2 may include a RRC connection request, a tracking area update, and a scheduling request. The eNB 110a then responds with MSG 4 which may include a contention resolution message.

Figure 9:
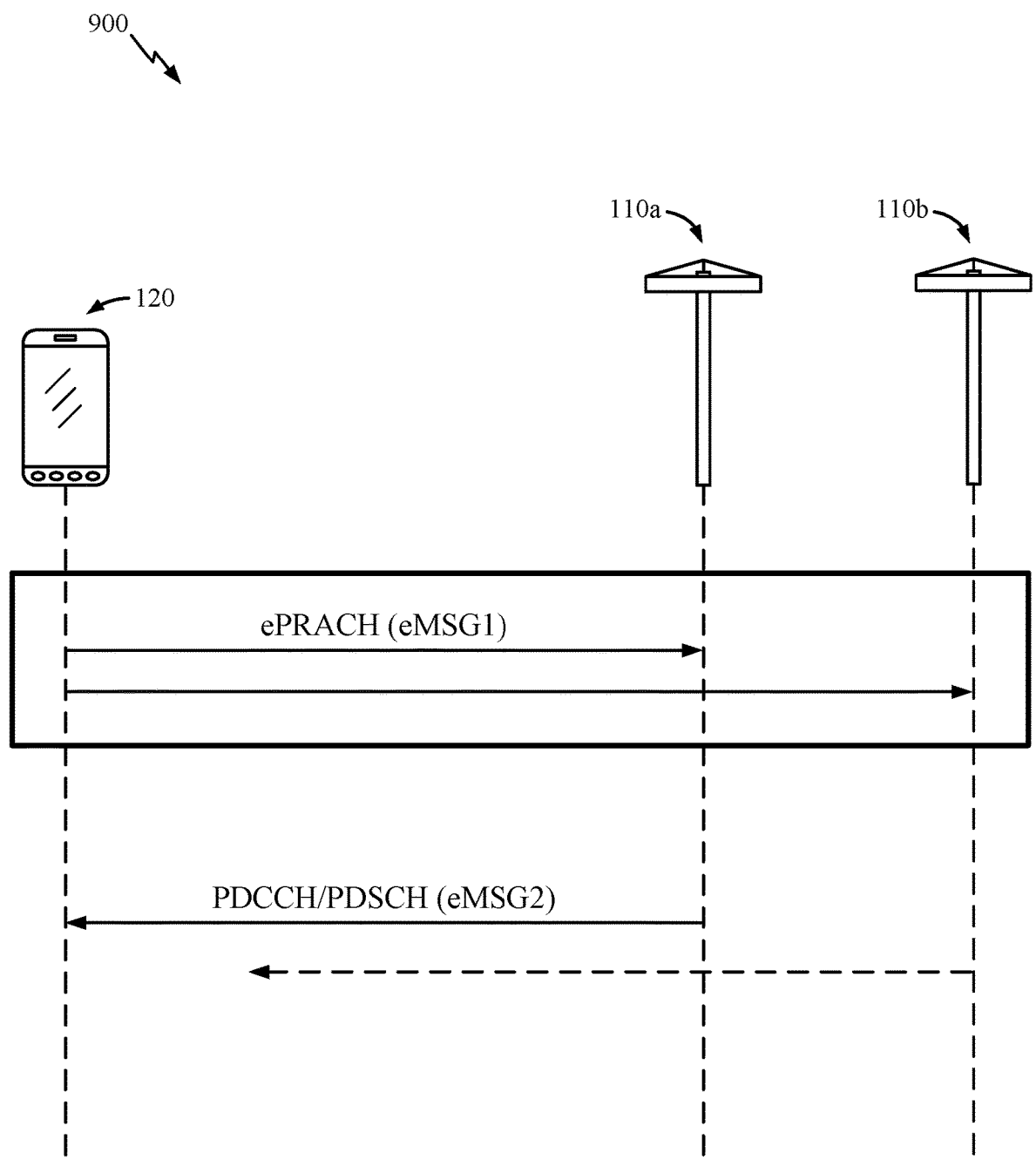
FIG. 9 illustrates a call-flow diagram for an example two-step RACH procedure, in accordance with certain aspects of the present disclosure.

FIG. 9 is a timing diagram 900 illustrating an example two-step RACH procedure, in accordance with certain aspects of the present disclosure. A first enhanced message (eMSG1) may be sent from the UE 120 to eNB 110a and eNB 110b on an enhanced physical random access channel (ePRACH). In this case, eMSG1 may include a RACH preamble for random access and demodulation reference signal (RS) for RACH payload demodulation. eMSG1 may also include a RACH message containing the UE-ID and other signaling information (e.g., buffer status report (BSR)) or scheduling request (SR). At least one eNB 110a or eNB 110b may respond with a random access response (RAR) message (eMSG2) which may include the ID of the RACH preamble, a timing advance (TA), a back off indicator, a contention resolution messages, UL/DL grant, and a transmit power control (TPC) commands.

Example Beam Indication During a RACH Procedure

Certain aspects of the present disclosure are generally directed to beam selection and indicating, for example, via an uplink transmission of a RACH procedure, one or more preferred beams to use for subsequent (uplink and/or downlink) messages (e.g., a subsequent transmission or retransmission).

In NR deployments, a RACH procedure may require beam-association between a beam used by a UE for UL transmissions and beams used for DL synchronization channel transmissions. Synchronization signals (SS), such as those shown in FIG. 6, are sent sweeping through a set of beams (e.g., the downlink signals are sent via a sweep across multiple beams). In general, a UE will transmit Msg1 using a beam selected based on a SS beam (e.g., one of the swept beams with a corresponding SS having the best receive quality).

In some cases, all subsequent messages to Msg1 (e.g., Msg2, Msg3, and Msg4 for a 4-step RACH, as well as ACK for Msg4) may be based on that same beam. This may be less than ideal, particularly in cases where channel conditions change significantly in the period of time between transmissions of these messages (e.g., a high mobility scenario such as a high speed train). Including training beams in Msg2, whose strengths can be reported in Msg3, may help improve Msg4 beam selection. Similarly, Msg3 may include training beams, based on which Msg4 can configure beams for future transmissions.

Unfortunately, the turn-around time for reacting to the beam-training may be a limitation in some scenarios, such as high-speed train or cases with asymmetry between uplink and downlink. Aspects of the present disclosure allow a UE to report not just a current preferred beam a UE selects based on a current location or channel conditions, but may also indicate a beam that is anticipated to be preferred at the time of a subsequent transmission (e.g., based on mobility and an expected time of the subsequent transmission).

Aspects of the present disclosure, provide techniques for providing an indication of beams for subsequent transmissions that may help address such scenarios. For example, in some cases, a first transmission of a RACH procedure (e.g., Msg1) may indicate a preferred beam or (beams) for subsequent transmissions (e.g., Msg2, other RACH messages, or even post-RACH messages after completion of the RACH procedure). The preferred beam(s) may be determined based on swept downlink transmissions as well as an anticipated time of the subsequent transmission(s).

Figure 10:
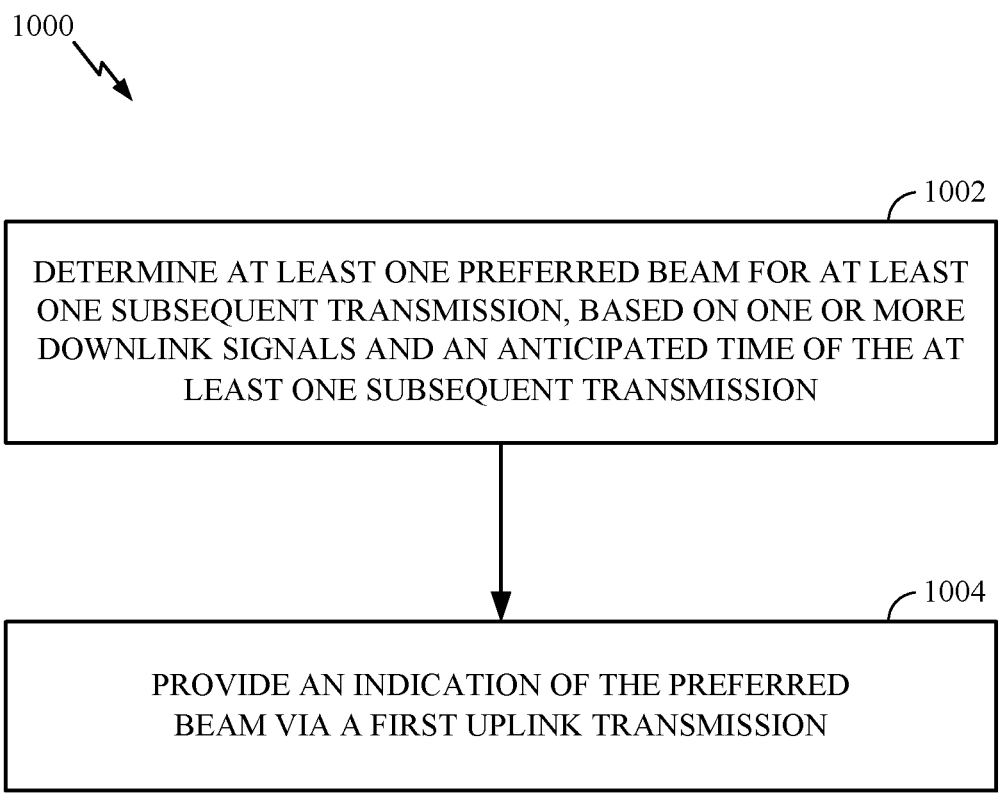
FIG. 10 illustrates example operations for wireless communication by a user equipment (UE), in accordance with certain aspects of the present disclosure.

FIG. 10 illustrates example operations 1000 for wireless communication, in accordance with certain aspects of the present disclosure. In certain aspects, the operations 1000 may be performed by a UE such as the UE 120.

The operations 1000 begin, at block 1002, by determining at least one preferred beam for at least one subsequent transmission, based on one or more downlink signals and an anticipated time of the at least one subsequent transmission. At 1004, the UE provides an indication of the preferred beam via a first uplink transmission.

Figure 11:
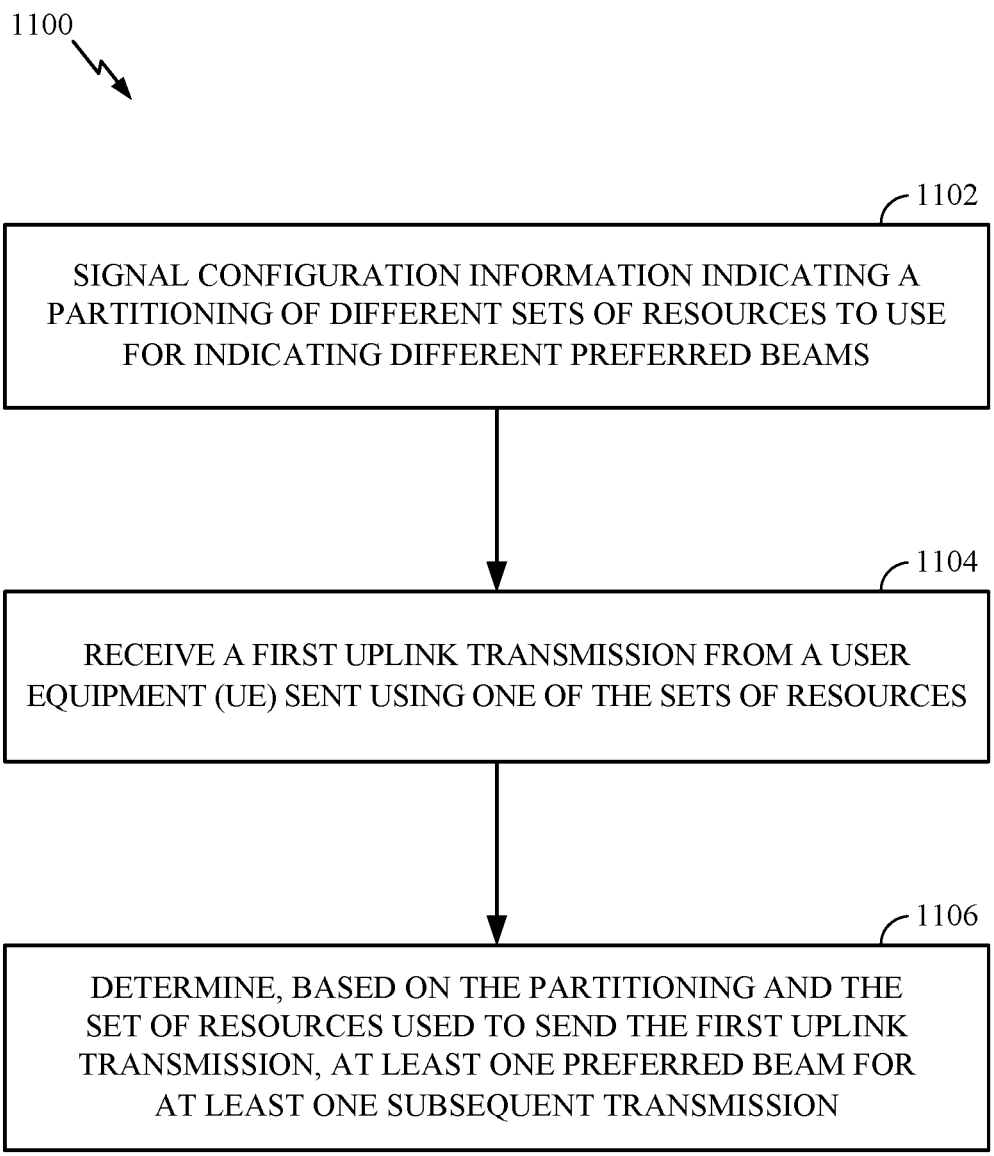
FIG. 11 illustrates example operations for wireless communication by a network entity, in accordance with certain aspects of the present disclosure.

FIG. 11 illustrates example operations 1100 for wireless communication, in accordance with certain aspects of the present disclosure. In certain aspects, the operations 1100 may be performed by an eNB such as the eNB 110a (or gNB) participating in a RACH procedure with a UE performing operations 1100 described above.

The operations 1100 begin, at block 1102, by signaling configuration information indicating a partitioning of different sets of resources to use for indicating different preferred beams. At 1104, the eNB receives a first uplink transmission from a user equipment (UE) sent using one of the sets of resources. At 1106, the eNB determines, based on the partitioning and the set of resources used to send the first uplink transmission, at least one preferred beam for at least one subsequent transmission.

As indicated above, in some cases, Msg1 may be used to (directly or indirectly) indicate a preferred beam direction for subsequent transmissions, such as Msg2. In some cases, the indication may simply be a default for Msg2 to use the same beam as Msg1 (e.g., a corresponding beam in a beam pair).

In a 4-step RACH scenario (e.g., as described above with reference to FIG. 8), Msg1 comprises a sequence and may be used to carry information via PRACH resource space partitioning. Such partitioning may indicate different sets of resources to signal different beams. Each set of resources, for example, could be a combination of a preamble sequence, time and/or frequency locations. In this manner, the resources selected for a PRACH transmission may indicate a preferred beam or combination of preferred beams.

As an example, a first set of resources may be assigned to indicate a "default" beam (e.g., use the same beam as Msg1), while a different set of resources assigned to indicate use a next SS-beam (e.g., i.e., if msg1 used SS-beam index i, then preferred beam for msg2 may correspond to SS-beam index (i+1) modulo (total number of SS beams) or some other beam index offset relative to a default beam index). Similarly, when multiple preferred beams are indicated (e.g., for multiple subsequent transmissions), partitioning may be performed so different sets of resources correspond to different combinations of preferred beams.

In some cases, such partitioning information may be signaled (carried) in a master information block (MIB) or remaining minimum system information (RMSI) that the UE reads it before start of RACH procedure. In some cases, RMSI may be carried in SIB1 (the terms 'SIB1' and 'RMSI' may even be used interchangeably). The remaining information in RMSI generally refers to system information a UE needs to acquire before the UE can transmit PRACH.

In a 2-step RACH scenario, such as that described above with reference to FIG. 9, Msg1 includes a payload. As such, the preferred beam-direction may be indicated in the payload or in its DMRS (it may be noted that a Msg1 PRACH sequence may be part of this DMRS).

In some cases, the UE may apply a receive (Rx) beam corresponding to the indicated beam direction to receive Msg2.

Various options exist for scenarios where 'non-default' indications will be provided. For example, in a high-speed train scenario (where speed is known and location may be accurately predicted for a given route) mobility may cause the optimal beam to change in a predictable manner in the time interval between Msg1 and the gNB response Msg2. The techniques presented herein may also be used where maximum permissible exposure (MPE) or some other source of UL/DL asymmetry might cause optimum beams for Msg1 and Msg2 to be different.

As noted above, the time period between messages (such as Msg1 to Msg2) may be considered when selecting a preferred beam. In some cases, Msg2 may arrive anywhere in a random access response (RAR) time-window, beginning at a fixed offset from the Msg1 transmission time. In some cases, such as an MPE scenario with low mobility, the optimum beam may be the same for all times in this window.

In high-speed train scenarios, however, this may not hold and the same beam may not be optimum for the entire window. Therefore, a preferred beam or beams may be selected based on a duration of a RAR window. In some cases, a narrower RAR window or different RAR window sizes may be used. The RAR window size may itself be a function of the PRACH resource used, based on a pre-configured PRACH resource-space partitioning.

In some cases (e.g., for relatively long RAR windows where the optimum beam may change), a UE may signal multiple optimum beams corresponding to different times within RAR window. In such cases, time-quantization of the RAR window may depend on window length, parameters indicated by PRACH resource-space partitioning, or other parameters (e.g., indicated in MIB or RMSI). Indicating multiple beams (for different times within a RAR window) may be particularly well suited to a 2-step RACH design where Msg1 can carry more information.

As noted above, in some cases, preferred beams may be indicated for subsequent transmissions after Msg1 and Msg2. For example, for a 4-step RACH procedure in a high-speed train scenario, the optimum beam for msg3 may also be different from that for msg2. Thus, depending on the delay between Msg2 and Msg3, different preferred beams may be selected and indicated (e.g., in Msg1 using the techniques described herein).

Since, for the 4-step RACH, Msg1 has low payload capacity (e.g., constrained by number of possible PRACH resource-space partitions), a very coarse quantization of "non-default" indications may be used. This approach may be extended to beam indication for even later messages, such as Msg4 and Msg5 (e.g., Acknowledgment "ACK" for Msg4). In some cases, the indication of preferred beams for these subsequent messages may be carried in Msg3, which has higher payload capacity than Msg1. In other words, this approach may be applied to Msg1, Msg3, or both.

For a 2-step RACH procedure, the response to Msg2 from the UE serves as an ACK that completes the RACH procedure. Thus, the beam for Msg2 and the beam for the UE response to Msg2 can be conveyed in Msg1 as well, using techniques described herein.

In any of the cases described above (e.g., 4-step or 2-step RACH), preferred beams to be used after connection is established (e.g., after the RACH procedure) may also be conveyed. For example, such beam information may be used to configure CSI-RS for subsequent training, or to pre-configure subsequent beam-switches based on known (or anticipated) mobility events.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining at least one preferred beam for at least one subsequent downlink transmission of a random access channel (RACH) procedure,
   based on one or more downlink signals and an anticipated time of the at least one subsequent transmission;
   providing an indication of the at least one preferred beam via a first uplink transmission;
   sending the first uplink transmission as part of the RACH procedure; and
   receiving the at least one subsequent downlink transmission of the RACH procedure via the at least one preferred beam subsequent to sending the first uplink transmission.

2. The method of claim 1, wherein:
   the one or more downlink signals are sent via a sweep across multiple beams; and
   the at least one preferred beam is determined based on receive signal quality of the multiple beams.

3. The method of claim 1, wherein:
   the first uplink transmission comprises a transmission or retransmission of a first message sent during the RACH procedure; and
   the determining the at least one preferred beam comprises determining the at least one preferred beam based, at least in part, on a duration of a random access response (RAR) window.

4. The method of claim 1, wherein the at least one preferred beam comprises a plurality of different beams indicated for use at different times within the RAR window.

5. The method of claim 1, wherein:
   the first uplink transmission comprises a RACH preamble transmission; and
   the at least one preferred beam comprises at least two preferred beams indicated for at least two transmissions that are part of the RACH procedure.

6. The method of claim 1, further comprising providing an indication of at least one preferred beam for use after completion of the RACH procedure.

7. The method of claim 1, wherein the first uplink transmission includes the indication in a payload of the first uplink transmission.

8. The method of claim 1, wherein:
   the at least one subsequent transmission comprises a downlink transmission of the RACH procedure; and
   the method further comprises processing the downlink transmission of the RACH procedure using a receive beam corresponding to the indicated at least one preferred beam.

9. The method of claim 1, further comprising:
   receiving configuration information indicating a partitioning of different sets of resources to use for indicating different preferred beams; and
   wherein providing the indication of the at least one preferred beam comprises providing the indication based on resources selected for the first uplink transmission based on the partitioning.

10. The method of claim 9, wherein providing the indication of the at least one preferred beam comprises:
    providing an indication of a first combination of preferred beams by selecting resources from a first set of the different sets of resources for the first uplink transmission; or
    providing an indication of a second combination of preferred beams by selecting resources from a second set of the different sets of resources for the first uplink transmission.

11. The method of claim 9, wherein:
    using resources from a first set of resources for the first uplink transmission indicates the at least one preferred beam has a first beam index offset relative to a beam index used for the first uplink transmission; and
    using resources from a second set of resources for the first uplink transmission indicates the at least one preferred beam has a second beam index offset relative to the beam index used for the first uplink transmission.

12. The method of claim 9, wherein receiving the configuration information comprises receiving the configuration information via at least one of a master information block (MIB) or remaining minimum system information (RMSI).

13. The method of claim 9, wherein:
    each set of resources comprises a combination of at least one sequence index, time location, and frequency location.

14. A method for wireless communications by a network entity, comprising:
    signaling configuration information indicating a partitioning of different sets of resources to use for indicating different preferred beams;
    receiving a first uplink transmission from a user equipment (UE) sent using one of the sets of resources,
    the first uplink transmission being part of a random access channel (RACH) procedure; and
    determining, based on the partitioning and the set of resources used to send the first uplink transmission, at least one preferred beam for at least one subsequent downlink transmission of the RACH procedure; and
    transmitting the at least one subsequent downlink transmission of the RACH procedure using the at least one preferred beam.

15. The method of claim 14, wherein the determining comprises:
    determining a first combination of preferred beams for at least two subsequent transmissions is indicated if the first uplink transmission is received using a first one of the sets of resources; or
    determining a second combination of preferred beams for the at least two subsequent transmissions is indicated if the first uplink transmission is received using a second one of the sets of resources.

16. The method of claim 14, wherein:
    the first uplink transmission comprises a transmission or retransmission of a first message sent during the RACH procedure; and
    a plurality of different beams are indicated for use at different times within a random access response (RAR) window.

17. The method of claim 14, wherein:
    the first uplink transmission comprises a RACH preamble transmission; and the at least one preferred beam comprises at least two preferred beams indicated for at least two transmissions that are part of the RACH procedure.

18. The method of claim 14, further comprising providing an indication of at least one preferred beam for use after completion of the RACH procedure.

19. The method of claim 14, wherein a payload of the first uplink transmission comprises the indication.

20. The method of claim 14, wherein:
the method further comprises transmitting the downlink transmission of the RACH procedure to the UE such that the UE receives the downlink transmission using a receive beam corresponding to the indicated preferred beam.

21. The method of claim 14, wherein:
a first set of resources for the first uplink transmission indicates the preferred beam has a first beam index offset relative to a beam index used for the first uplink transmission; and
a second set of resources for the first uplink transmission indicates the preferred beam has a second beam index offset relative to the beam index used for the first uplink transmission.

22. The method of claim 14, wherein the configuration information is signaled via at least one of a master information block (MIB) or remaining minimum system information (RMSI).

23. The method of claim 14, wherein:
each set of resources comprise a combination of at least one sequence index, time location, and frequency location.

24. An apparatus for wireless communications by a user equipment (UE), comprising:
means for determining at least one preferred beam for at least one subsequent downlink transmission of a random access channel (RACH) procedure, based on one or more downlink signals and an anticipated time of the at least one subsequent transmission;
means for providing an indication of the preferred beam via a first uplink transmission;
means for sending the first uplink transmission as part of the RACH procedure; and
means for receiving the at least one subsequent downlink transmission of the RACH procedure via the at least one preferred beam subsequent to sending the first uplink transmission.

25. An apparatus for wireless communications by a network entity, comprising:
means for signaling configuration information indicating a partitioning of different sets of resources to use for indicating different preferred beams;
means for receiving a first uplink transmission from a user equipment (UE) sent using one of the sets of resources, the first uplink transmission being part of a random access channel (RACH) procedure; and
means for determining, based on the partitioning and the set of resources used to send the first uplink transmission, at least one preferred beam for at least one subsequent downlink transmission of the RACH procedure; and
means for transmitting the at least one subsequent downlink transmission of the RACH procedure using the at least one preferred beam.

26. The apparatus of claim 24, wherein:
the one or more downlink signals are sent via a sweep across multiple beams; and
the at least one preferred beam is determined based on receive signal quality of the multiple beams.

27. The apparatus of claim 24, wherein:
the first uplink transmission comprises a transmission or retransmission of a first message sent during the RACH procedure, and
the means for determining the at least one preferred beam are configured to determine the at least one preferred beam based, at least in part, on a duration of a random access response (RAR) window.

28. The apparatus of claim 24, further comprising:
means for receiving configuration information indicating a partitioning of different sets of resources to use for indicating different preferred beams, and
wherein the means for providing the indication of the at least one preferred beam is configured to provide the indication based on resources selected for the first uplink transmission based on the partitioning.

* * * * *